United States Patent [19]

Kinoshita et al.

[11] Patent Number: 4,616,331
[45] Date of Patent: Oct. 7, 1986

[54] INFORMATION PROCESSING SYSTEM CONSISTING OF AN ARITHMETIC CONTROL UNIT FORMED INTO A ONE-CHIP TYPED BY APPLICATION OF A HIGHLY-INTEGRATED SEMICONDUCTOR DEVICE

[76] Inventors: Tsuneo Kinoshita, 2-21-18, Fujimoto, Kokubunji-shi, Tokyo; Fumitaka Sato, 4-18-3, Imadera, Ome-shi, Tokyo; Isamu Yamazaki, 1-6-1, Haginuma, Takatsu-ku, Kawasaki-shi, all of Japan

[21] Appl. No.: 236,116

[22] Filed: Feb. 19, 1981

[30] Foreign Application Priority Data

Feb. 25, 1980 [JP] Japan ................................. 55-22489
Mar. 11, 1980 [JP] Japan ................................. 55-30531
Mar. 11, 1980 [JP] Japan ................................. 55-30532

[51] Int. Cl.⁴ ........................ G06F 9/30; G06F 13/00
[52] U.S. Cl. .................................. 364/736; 364/200
[58] Field of Search ..................... 364/736, 200, 900

[56] References Cited

U.S. PATENT DOCUMENTS 3,845,474 10/1974 Lange et al. ........................ 364/200
4,087,854  5/1978 Kinoshita et al. .................. 364/200
4,161,024  7/1979 Joyce et al. ........................ 364/200
4,293,908 10/1981 Bradley et al. ..................... 364/200
4,402,044  8/1983 McDonough et al. ............. 364/200

Primary Examiner—Eddie P. Chan

[57] ABSTRACT

In a one-chip high density arithmetic control unit capable of prefetching user's instructions from main memory, an arithmetic logic unit (ALU) subtracts the contents of a location counter holding the address of the next instruction to be executed, from the contents of a memory address register holding an address into which data will be written. The difference is fed through the gates connected to the ALU for determining whether or not prefetched instructions will have to be refetched. An address matching mechanism provided outside the one-chip arithmetic control unit includes a comparator for comparing memory addresses to a preset execution stop address. The output signal of the comparator is stored in a memory section which is provided to correspond to the prefetched instruction buffer, and when an instruction stored in the prefetched instruction buffer is transferred to an instruction register, the signal stored in the corresponding memory section is also read out and used to determine whether to stop execution. Further, whenever access is made to main memory a signal indicating whether the access is legal is externally generated and may be stored in a second memory section. Like the address matching signal, this signal is read out when the corresponding instruction from the prefetched instruction buffer is transferred to the instruction register. An illegal address interruption is produced when this signal indicates that the address was illegal.

4 Claims, 7 Drawing Figures

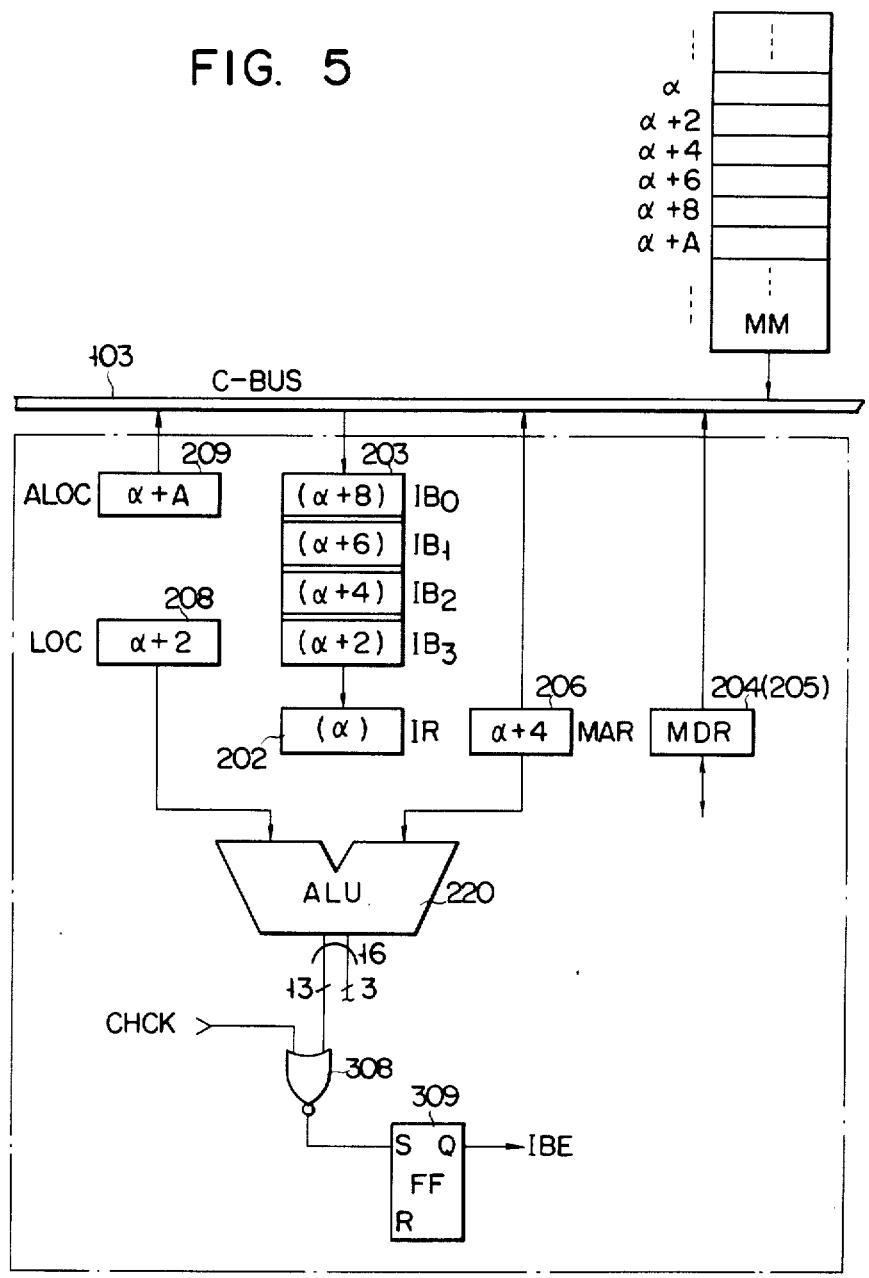

INFORMATION PROCESSING SYSTEM CONSISTING OF AN ARITHMETIC CONTROL UNIT FORMED INTO A ONE-CHIP TYPED BY APPLICATION OF A HIGHLY-INTEGRATED SEMICONDUCTOR DEVICE

BACKGROUND OF THE INVENTION

This invention relates to information processing systems including arithmetic control units capable of prefetching user's instructions from main memory and, more particularly, a unit of this type which is formed as a single large-scale semiconductor integrated circuit chip.

Owing to recent advancements in semiconductor techniques, the arithmetic control unit which consitutes a major part of information processing systems can be provided as a single very large scale integrated semiconductor element (hereinafter referred to as VLSI). With the implementation of the arithmetic control unit in VLSI, improved reliability, increased compactness and improved price versus performance ratios can be expected. However, use of VLSI also causes such problems as control of package pin count, limitation on power consumed and limitations upon capacity of accomodation and performance. To solve these problems, the future development of techniques for applying VLSI is a great concern. Of these technical problems, this invention relates to the problems of limitations imposed upon the accommodation capacity and performance.

Information processing systems in which user's instructions are decoded and executed under microprogram control include those in which user's instructions are prefetched for the purpose of high speed processing. An arithmetic control unit which is a component element of such an information processing system usually includes a prefetch control mechanism and a plurality of instruction buffer stages where a plurality of different prefetched user instructions can be stored. It further includes an instruction register for holding the instruction being executed, a location counter for holding the location of the instruction to be executed next, a memory address register for holding the memory address of the next operand to be fetched and a prefetch instruction location counter for holding the location of the user instruction to be prefetched next. The prefetch control mechanism permits successive user instructions to be fetched from main memory and stored in successive instruction buffer stages. The prefetched instructions stored in instruction buffer are read out in the order of their storage when desired.

It is now assumed that contents in addresses (alpha+4), (alpha+6), (alpha+8) and (alpha+A) of main memory have been stored in the instruction buffers as shown in FIG. 1 and that an instruction in address alpha which has already been read into the instruction buffer register is a "store" instruction for overwriting the contents of, for instance, the address (alpha+4) of main memory. After the "store" is executed, the instruction in the instruction buffer is no longer the same as the contents of the address (alpha+4) of main memory. Therefore, if the program is executed without any correction, a malfunction results. For this reason, as soon as the contents in contents of the address (alpha+4) of main memory is overwritten, the contents of the instruction buffers are rendered ineffective. Likewise, the contents of the instruction buffers are rendered ineffective when the program is branched. In either case, therefore, it is necessary to re-fetch the contents of the instruction buffers.

In some systems, whenever main memory is written into, as by the aforementioned "store" instruction, the destination address is compared with both the contents of the location counter and that of the prefetch instruction location counter and, if the contents of the destination address is equal to or greater than the location counter contents and smaller than the prefetch instruction location counter contents, the contents of the instruction buffers are rendered ineffective. In other systems, the contents of the instruction buffers are rendered ineffective automatically and without any comparison.

In the case of the first type, in order to obtain high speed processing, two oomparators are required. The provision of two comparators in VLSI, however, introduces difficulties particularly in wiring inside the chip and is therefore not recommended. With the second type, the processing performance obtainable is inferior.

In another aspect, in an arithmetic control unit formed as a single chip (hereinafter referred to as one-chip CPU) as mentioned above, in which a plurality of internal instruction prefetch buffer stages are provided in order to reduce the time required for instruction fetches from an external main memory, an address matching mechanism is provided outside the chip. Such an address matching mechanism functions such that when the one-chip CPU makes access to a memory address preset by the operator or the like, it produces an interrupt instruction to stop the program under execution upon detecting a coincidence of addresses, and it is used when it is desired to interrupt a program at a desired step. For the mechanism to be useful, the execution stop must be brought about when the one-chip CPU is about to execute the data processing contents in the preset address. With the construction as described above, however, the one-chip CPU always undertakes a prefetch. It is therefore possible that the coincidence of addresses is detected at the time when access is made to the main memory for prefetching an instruction, which may be earlier than the time the instruction is to be executed. Therefore, timing is not proper if an address stop takes place at the time of detection of the coincidence of addresses, and proper address matching is not fulfilled. Instead, it is necessary to produce an interrupt upon detection of coincidence of addresses but at the time a prefetched instruction is executed, i.e., the time at which the instruction is output from the prefetch instruction buffers. Thus, it has been desired to effectively realize address matching which can bring about an address stop at the proper time within the physical restrictions imposed upon a one-chip CPU.

In a further aspect, in a one-chip CPU, in addition to providing a plurality of internal instruction prefetch buffer stages in order to reduce the time required for an instruction fetch from an external main memory and permit high speed processing, it is thought to provide an external address conversion mechanism (address conversion table) for expanding the address space of main memory. In such a construction, when a segment in the address conversion table is specified according to logical address data from the one-chip CPU, the main memory may be accessed according to a physical address corresponding to the specified segment. If the segment is undefined, that fact must be noted at the time the access is attempted. Since the one-chip CPU undertakes prefetching of instructions as mentioned earlier, it is already storing some prefetch instructions in its internal prefetch instruction buffers for execution. Therefore, the time at which the address conversion table is consulted, and the time at which the accessed instruction is actually output from the buffers and executed, are different from each other. This means that even if an illegal address is detected through consultation of the address conversion table, the production of an illegal address interrupt at that time would not be timed properly. Accordingly, in such a construction the one-chip CPU must include a mechanism for properly timing illegal address interrupts, and means for effectively realizing such a mechanism within the physical limitations imposed upon the chip.

SUMMARY OF THE INVENTION

An object of the invention is to provide an arithmetic control unit formed into one chip by application of a highly integrated semiconductor device, which is provided with a means for subtracting the contents of the location counter from the contents of the memory address register, and in which when the result R of such subtraction is greater than 0 and less than $M \times N$ (i.e., $0 \text{ LE } R < M \times N$), M being the number of instruction buffers stages and N being the number of bytes in each stage, or when a branch instruction is executed, the contents of the instruction buffers are rendered ineffective and re-fetched so that malfunction can be prevented without sacrifice in the prosessing performance.

Another object of the invention is to provide an arithmetic control unit formed into one chip by application of a highly integrated semiconductor, in which execution stop by an external address matching mechanism can be timed properly without the need to assign package pins for the address matching mechanism.

A further object of the invention is to provide an arithmetic control unit formed into one chip by application of a highly integrated semiconductor device provided with a plurality of prefetch instruction buffer stages inside the chip and with an address conversion mechanism outside the chip, in which an externally generated illegal address flag can be coupled to the one-chip CPU without the need to assign a package pin specifically for that purpose, such that an illegal address interrupt based upon that flag can be properly timed.

According to the invention, it is possible to provide a high performance arithmetic control unit in which malfunction can be prevented without sacrifice in processing performance when the contents of the instruction buffers become inaccurate, and also high density integration of the semiconductor element can be obtained readily and efficiently.

Also, according to the invention it is possible to provide an arithmetic control unit formed into one chip by application of a highly integrated semiconductor device including a plurality of prefetch instruction buffer stages and capable of permitting an execution stop by an external execution stop mechanism, always with proper timing and without the need to assign package pins to the execution stop mechanism.

Further, according to the invention it is possible to provide an arithmetic control unit formed into one chip by application of a highly integrated semiconductor device including a plurality of prefetch instruction buffer stages, in which an external address conversion mechanism capable of generating properly timed illegal address interruptions can be effectively realized within the physical restrictions imposed upon the chip.

BRIEF DESCRIPTION OF THE DRAWINGS

The above and other objects, features and advantages are apparent from the following description taken in connection with the accompanying drawings, in which:

FIG. 5 is a schematic block diagram showing the state (state of storage of instruction and location) of some parts of the one-chip CPU of FIG. 3 when data is being written into main memory;

DETAILED DESCRIPTION OF A PREFERRED EMBODIMENT

Figure 2:
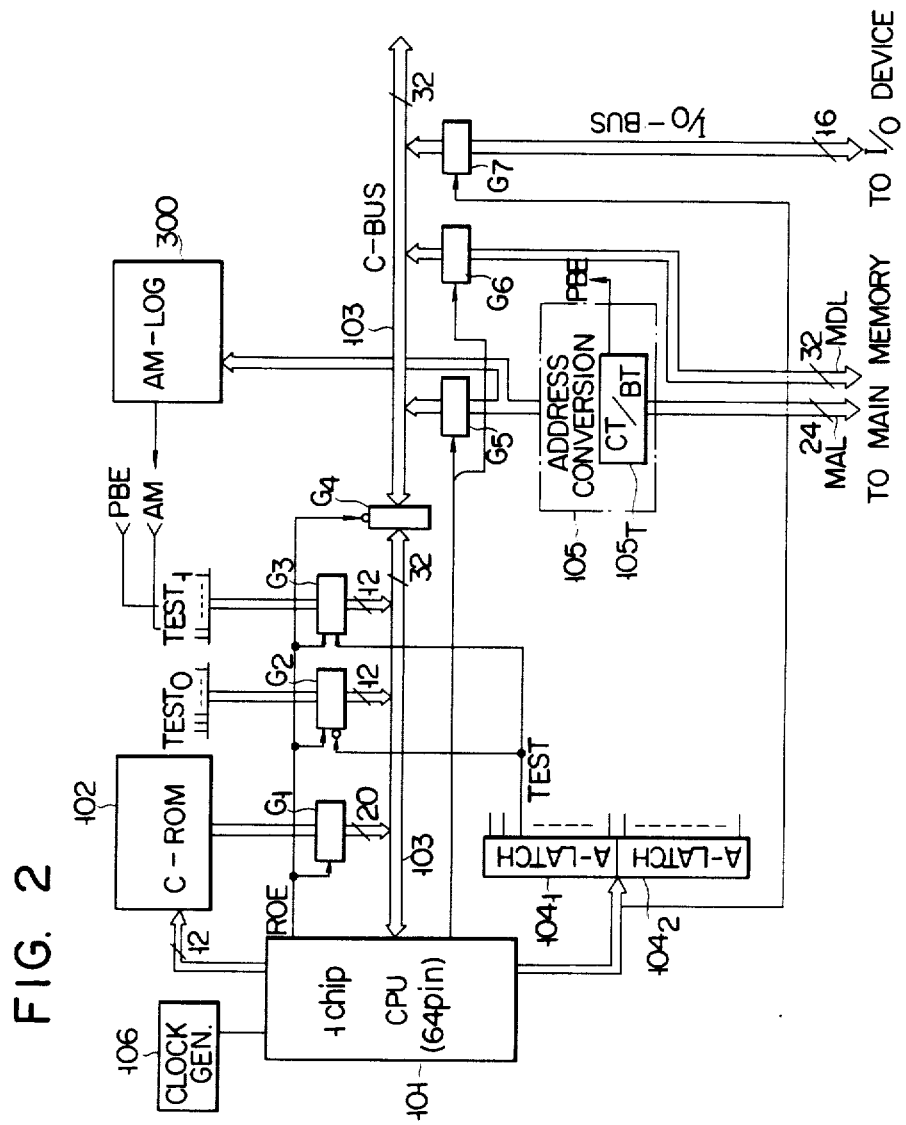
FIG. 2 is a block diagram showing the basic construction of a one-chip arithmetic control unit embodying the invention and its peripheral circuitry.

Now, an embodiment of the invention will be described with reference to the accompanying drawings. FIG. 2 shows a block diagram of the basic construction of a one-chip arithmetic control circuit, which constitutes the subject matter of the invention, together with peripheral circuitry. Referring to the Figure, designated at 101 is a central processing circuit (hereinafter referred to as one-chip CPU) constituted by a very large-scale semiconductor integration chip (VLSI), with 64 external-connection pins provided on one package. Designated at 102 is an external control memory (hereinafter referred to as C-ROM) in which microprograms for controlling the one-chip CPU 101 are stored. Designated at 103 is a 32-bit common bus (hereinafter referred to as C-BUS) through which the one-chip CPU 101 is coupled to external units. The output data (microinstructions), memory address data, memory data, I/O (input/output) data, etc. from the C-ROM 102 are transferred through the C-BUS 103 on a time division basis. Designated at $104_1$ and $104_2$ are addressable latch circuits, which are provided outside the one-chip CPU 101 and have a decoding function. They produce various external control signals in accordance with control signals produced from the one-chip CPU 101.

Designated at 105 is an address conversion unit provided for expanding the address space of the main memory. It provides physical addresses by consulting with a conversion table $105_T$ according to logical addresses and segment information transferred from the one-chip CPU 101 through the C-BUS 103. When generating physical address data, a one-bit PBE signal indicating whether or not the specified segment is undefined is also generated by the conversion table $105_T$. The address conversion unit 105 provides different functions depending upon two different external setting signals (BTMD, CTMD). One of these functions involves address conversion through base modification, and the other involves address conversion through page modification. The conversion table $105_T$ which constitutes a main part of the address conversion unit 105 is used differently in each case. When the table is used in the case of base modification, it is referred to as BT (base address table) while in the case of page modification it is referred to as CT (conversion table).

Designated at 106 is a clock generator for producing a basic clock signal for the one-chip CPU 101. Designated at $G_1$ to $G_7$ are gate circuits for controlling data transfer through the C-BUS 103. When a microinstruction (20 bits) read out from the C-ROM 102 is transferred through the C-BUS 103 to the one-chip CPU 101, with the gate circuit $G_1$ open (conducting) by a control signal (ROE) from the one-chip CPU 101, the gate circuit $G_4$ is closed to separate it from the remainder of the C-BUS 103. When the gate circuit $G_1$ is open, one of the gate circuits $G_2$ and $G_3$ is selectively closed. An external signal group (12 bits) TEST 0 from the gate circuit $G_2$, which is open during system initialization, or an external signal group (12 bits) TEST 1 from the gate circuit $G_3$, which is open during ordinary program reading, are transferred through the C-BUS 103 together with a microinstruction from the C-ROM 102 to the one-chip CPU 101. The external signal group TEST 1 includes the PBE signal produced from the conversion table $105_T$ and a one-bit AM signal produced from an address matching logic unit (hereinafter referred to as AM-LOG) 300 which is provided outside the one-chip CPU 101. When a microinstruction is not being read, the gate circuit $G_4$ is opened while the gate circuits $G_5$, $G_6$ and $G_7$ are selectively opened for data transfer between the one-chip CPU 101 on one hand and the address conversion unit 105, main memory section or other input/output units on the other hand, through the C-BUS 103 and various buses connected thereto.

Designated at MAL is a memory address line contained in the memory bus, and at MDL a memory data line in the bus. The AM-LOG 300 compares an execution stop address (here a logical address), as preset by switches or the like, and a memory address (logical address) when the one-chip CPU 101 accesses main memory. The AM-LOG 300 produces a one-bit AM signal of level "1" if the compared addresses coincide.

Figure 3A:
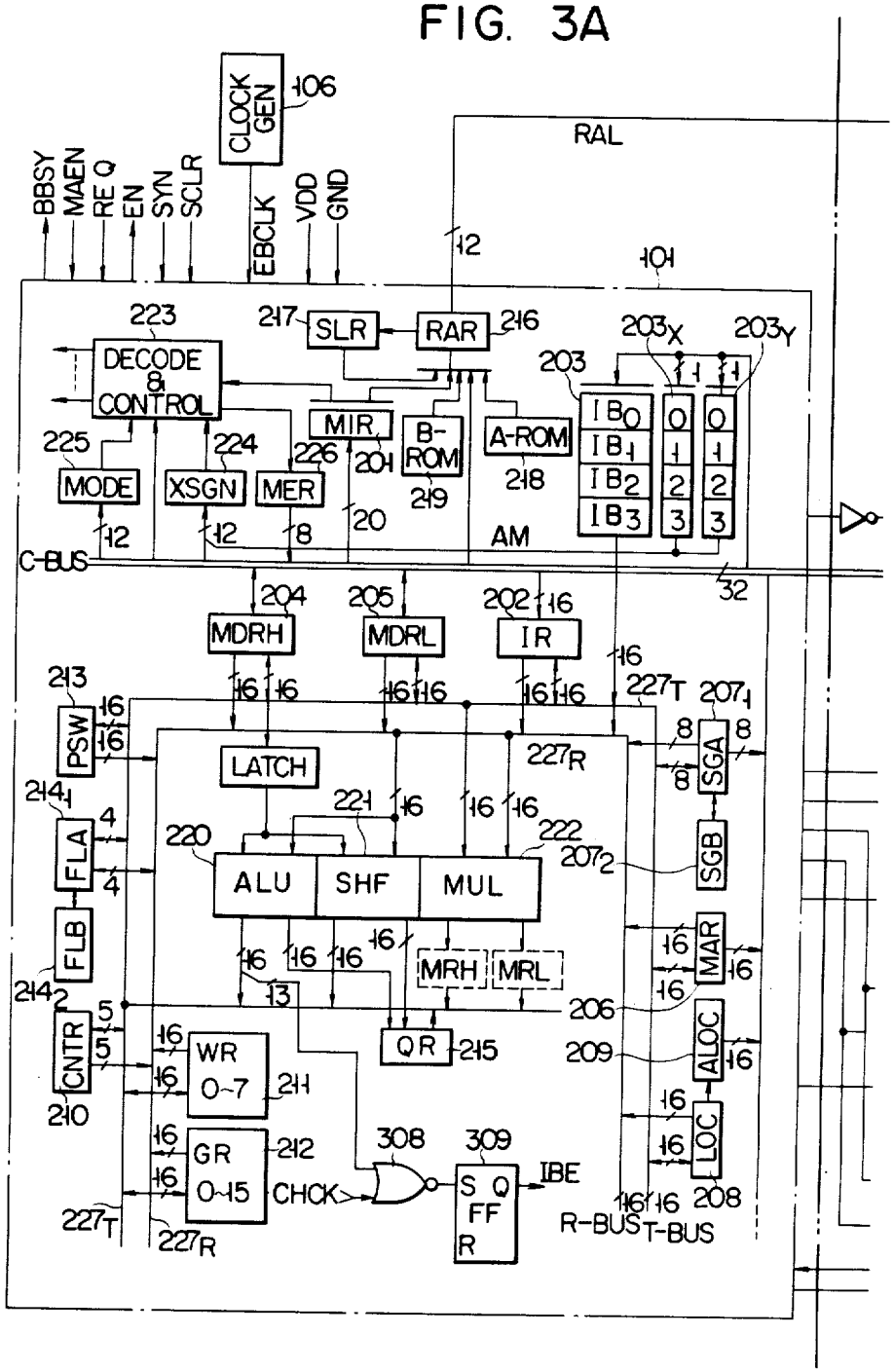
FIGS. 3A and 3B is a detailed block diagram showing the construction outlined in FIG. 2.
Figure 3B:
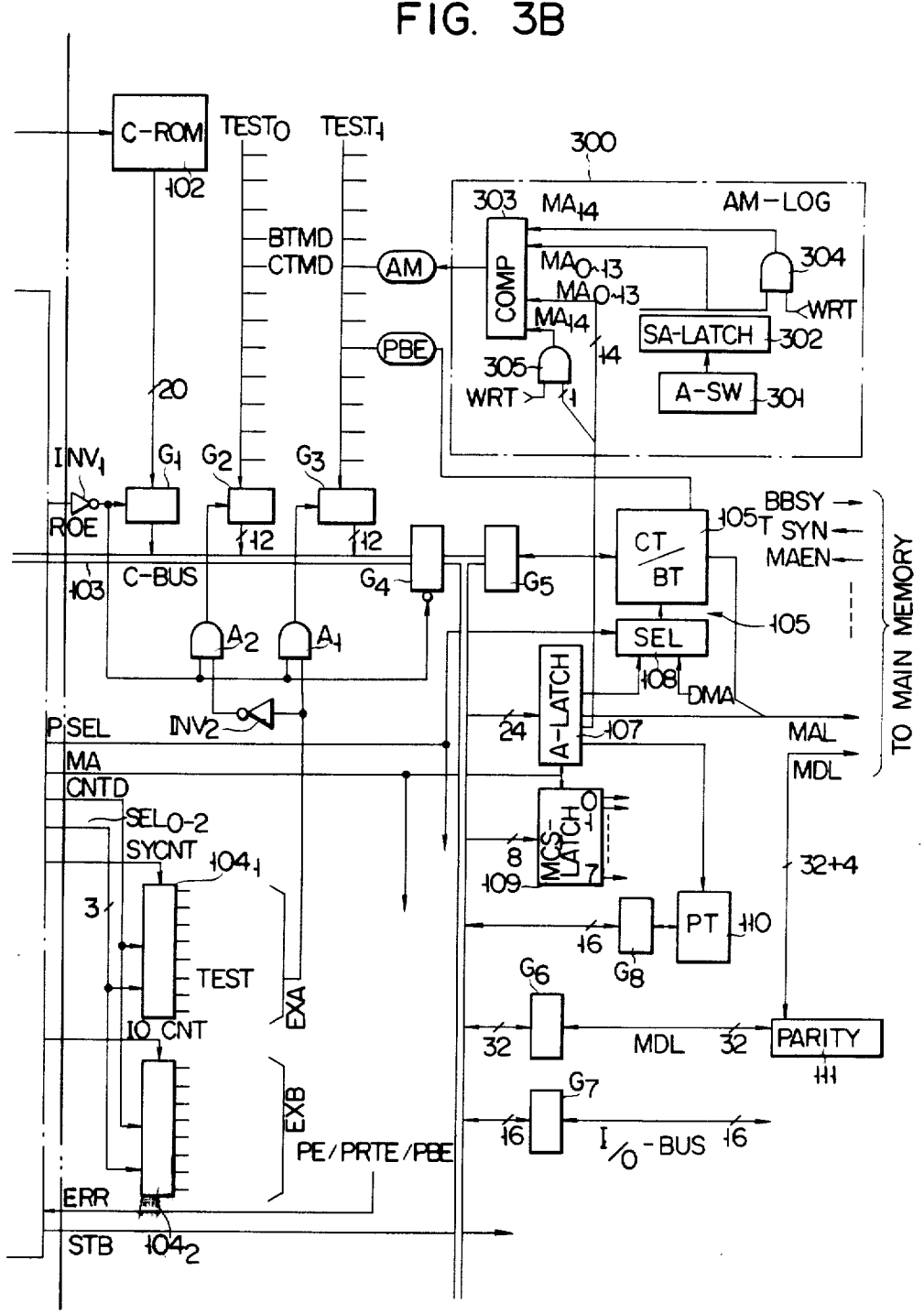

FIGS. 3A and 3B show a block diagram of the detailed construction of the unit shown in FIG. 2. The one-chip CPU 101 is connected to the external circuits by its 64 terminals (pins) including those connected to the 32-bit C-BUS. The following structures are built into the chip.

(1) MIR (microinstruction register) 201 (20 bits).

This register stores microinstructions read out from the C-ROM 102; microinstructions read out from the C-ROM 102 are transmitted to the register 201 through the C-BUS 103.

(2) IR (instruction register) 202 (16 bits).

This register holds a user instruction being executed. User instructions, when read out from an instruction buffer ($IB_{0-3}$) 203, in which prefetched user instructions are stored, are transferred to the IR 202.

(3) $IB_{0-3}$ (instruction buffer) 203 (16 bits×4).

This register prefetches user instructions. When a user instruction in the IR 202 is executed, the next user instruction is transferred from the $IB_{0-3}$ 203 to the IR 202. Data in the $IB_{0-3}$ 203 can be output to internal buses (T-BUS and R-BUS) $227_T$ and $227_R$ according to a microinstruction, but data cannot be written from the T-BUS $227_T$ or R-BUS $227_R$ to the $IB_{0-3}$ 203. Writing of user instructions in the $IB_{0-3}$ 203 is done through the C-BUS 103.

As subordinate registers to the $IB_{0-3}$ 203, particular signal memory sections (AM,$PBE_{0-3}$ 203x, 203y having four one-bit stages each, corresponding to each of the four stages of the $IB_{0-3}$ 203, is provided. When an instruction is prefetched, a one-bit AM (address match) signal output from the AM-LOG 300 is stored in the same stage of the $AM_{0-3}$ 203x, in a correspondence relation to the prefetched instruction word. When the prefetched instruction word is transferred from the $IB_{0-3}$ 203 to the IR 202, the AM signal corresponding to that instruction word is also read out at the same time. The AM signal is stored in a previously assigned position of an external signal register (XSGN) 224, to be described later. In the $PBE_{0-3}$ 203y, a one-bit signal representing the legality of a main memory access, generated by the address conversion section 105 at the time an instruction is prefetched, is stored in a corresponding relation to that instruction word. More particularly, a one-bit PBE (physical block error) signal containing information as to whether a segment specified by consultation with the conversion table $105_T$ is undefined is stored when logical/physical address conversion is made upon prefetch. The PBE signal corresponding to the prefetched instruction word is read out from $PBE_{0-3}$ at the same time that the instruction word is read out from the $IB_{0-3}$ 203 and transferred to the IR 202. The PBE signal read out from the $PBE_{0-3}$ 203y is stored in the XSGN 224 in a previously assigned position thereof.

(4) MDRH (memory data register high) 204 (16 bits).

This register serves to hold the upper 16 bits of the 32 data bits on C-BUS 103. It can receive data from C-BUS 103 and output data thereto. Further, it can output data to R-BUS $227_R$ and T-BUS $227_T$ and receive data from T-BUS $227_T$.

(5) MDRL (memory data register low) 205 (16 bits).

This register serves to hold the lower 16 bits of the 32 data bits on C-BUS 103. It can receive data from C-BUS 103 and output data thereto. It can also output data to R-BUS $227_R$ and T-BUS $227_T$ and receive data from T-BUS $227_T$.

(6) MAR (memory address register) 206 (16 bits).

This register serves to hold the main memory address (logical address). The address data of MAR 206 is appended to 8 data bits from the segment register and output as a 24-bit address over C-BUS 103. Since the C-BUS 103 is used on a time division basis as mentioned earlier, the A-LATCH 107 is provided outside the chip to latch this address. In the MAR 206, "2" or "4" is counted as a unit.

(7) SGA, SGB (segment register A, B) $207_1$, $207_2$, (8 bits by 2).

These registers are provided for expanding the logical address space, and data for specifying segments in the externally provided conversion table $105_T$ are stored in them. The contents of registers $207_1$ and $207_2$ and the contents of MAR 206 together constitute a source of physical addresses. The SGB $207_2$ is a temporary register used by certain instructions.

(8) LOC (location counter) 208 (16 bits).

This counter holds user instruction addresses. Every time a user instruction is read into IR 202, LOC 208 is incremented by 2 and holds the address of the next user instruction.

(9) ALOC (advanced location counter) 209 (16 bits).

This register holds the address of the next user instruction to be read out from main memory. For the purpose of control of instruction prefetch, its contents lead the address held in LOC 208 by 2 or 4 bytes.

(10) CNTR (counter register) 210 (8 bits).

This counter is a binary down-counter used for loop counting in microprograms, multiplication, division and shifting.

(11) WR$_{0-7}$ (working registers) 211 (16 bits by 8).

These registers are used for holding intermediate results in a microprogram. They can be directly specified as a source or destination register by a microinstruction.

(12) GR$_{0-15}$ (general register) 212 (16 bits by 16)

These registers can be accessed as general registers by user instructions. They can be used as accumulators or index registers.

(13) PSW (program status word) 213 (16 bits).

In this register, the status of the one-chip CPU is stored. It holds the interrupt mask, internal operation result states, the memory address mode, the master/slave mode and various other internal states.

(14) FLA, FLB (flag register A,B) 214$_1$, 214$_2$ (4 bits by 2).

These registers store arithmetic/logical operation states.

(15) QR (quotient register) 215 (16 bits).

This register is used as a quotient register to the ALU 220 for arithmetic/logical operations and to SHF 221 for high speed shifting.

(16) RAR (ROM address register) 216 (12 bits).

This register holds the address of a microinstruction to be read out next. The address stored in RAR 216 is transferred through a 12-bit ROM address line to the C-ROM 102. The RAR 216 increments by 1 every time a microinstruction is read out.

(17) SLR (subroutine link register) 217 (12 bits).

In this register a return address when executing a microcode subroutine is stored.

(18) A-ROM (internal ROM A) 218 (12 bits by 2).

An internal ROM which stores the start address of the microinstructions to be executed after the clearing of the system or receipt of an interrupt.

(19) B-ROM (internal ROM B) 219 (12 bits by 256).

An internal ROM which serves as a table of microinstruction start addresses corresponding to user instruction operation codes (OP codes). It has addresses corresponding to the address (addresses 0 to 255) of the C-ROM 102 and capable of being specified by the OP code portion (8 bits) of the user instruction in IR 202. In each address of the B-ROM 219, decision data as to whether the microprogram corresponding to the OP code ends in one step or requires two or more steps, and whether it should be handled as an illegal instruction are stored. In each address of the C-ROM 102 corresponding to each address of the B-ROM 219 for example, in address 0 to 255, the following contents are stored. With a microinstruction that is only one stop long, the entire microinstruction is stored. With a microinstruction that requires two or more steps, the microinstruction for the first step is stored in the C-ROM 102, and the address of the C-ROM 102 of the microinstruction for the second step is stored. Further, in the case of an illegal instruction B-ROM 219 produces all "0"s, the start address of a microprogram for error processing.

(20) ALU (arithmetic and logic unit) 220.

This is a combination logic circuit for binary 16-bit parallel arithmetic and logical operations, and includes a one-digit decimal arithmetic circuit. Operation data from R-BUS 227$_R$ is directly coupled to the ALU 220, while operation from the T-BUS 227$_T$ is coupled to the ALU 220 after it is latched in a latch circuit (LATCH). The operation result is output to the T-BUS 227$_T$.

(21) SHF (shifter) 221.

This is a hardware shifter which effects shift left circular or shift right circular 1 to 15 bits in one cycle. The shift number is specified by the lower 4 bits of R-BUS 227$_R$, which are directly coupled to SHF 221. Data from T-BUS 227$_T$ is coupled thereto through the latch circuit (LATCH). The result of shift is output to the T-BUS 227$_T$.

(22) MUL (multiplier) 222.

This is a high speed multiplier of 16 by 16 bits. Data from the T-BUS 227$_T$ and R-BUS 227$_R$ are coupled to it, and of the double length result the upper part is transferred to a MRH register and the lower part to a MRL register. In practice, the MRH and MRL are imaginary registers and not physically present, and their equivalent is assembled within MUL 222.

(23) DECODE & CONT (decoder and controller) 223.

This serves as a decoder and control circuit for decoding microinstructions stored in the MIR 201 to obtain various control signals. In addition to the output of the MIR 201, other predetermined signals are also coupled for decoding to obtain control signals.

(24) XSGN (external signal register) 224 (12 bits).

In this register, the external signal group (12 bits) of TEST 1, coupled through the C-BUS 103 together with a microinstruction read out from the C-ROM 102, is stored. The contents of XSGN 224 is transferred to the DECODE & CONT 223. Of the external signal group TEST 1, the AM signal output from the AM-LOG 300 may be directly coupled to the C-BUS 103 together with the other external signals of TEST 1 or indirectly coupled to effect delayed timing. More particularly, when the one-chip CPU access main memory to fetch an operand, the AM signal is coupled to the XSGN 224 at a previously assigned position thereof together with the other external signals of TEST 1; but when the CPU accesses main memory to fetch a user instruction the AM signal is buffered in AM$_{0-3}$ 203$x$ in a fixed correspondence relation to the instruction taken out at that time (i.e., instruction prefetch). In the latter case, when the corresponding instruction is subsequently read out from IB$_{0-3}$ 203, the AM signal is read out from AM$_{0-3}$ at the same time ("IBE timing") and stored in the XSGN 224 at a previously assigned position thereof. Once the AM memory bit position of the XSGN 224 is set by the AM signal (AM="1"), it is not reset by a subsequent AM signal level change to "0" but is restored to the reset state only by a reset command from a microinstruction.

A similar function is performed with respect to the PBE (physical block error) signal from the address conversion unit 105. Upon fetching of a user instruction the PBE signal is not directly output to the C-BUS 103 but is once buffered in the PBE$_{0-3}$ 203$y$ in a fixed correspondence relation to the prefetched instruction and then stored in the XSGN 224 at a predetermined position thereof when the corresponding instruction (fetched in advance) is read into IR 202. The PBE memory bit of the XSGN 224, when set by the PBE signal (PBE ="1"), is not reset when this signal is subsequently changed to "0" but is reset only by a specific reset command.

(25) MODE (mode register) 225 (12 bits).

This register stores the external signal group (12 bits) TEST 0 which is coupled through the C-BUS 103 in the microinstruction read cycle during system start-up. The contents of this register are transferred to the DECODE & CONT 223.

(26) MER (memory control register) 226 (8 bits).

This register stores memory control system data (of 8 different kinds) output from the DECODE & CONT 223. The contents of the MER 226 are output through the C-BUS 103 together with the contents of the MAR 206 and SGA $207_1$.

(27) T-BUS, R-BUS (transfer bus, receiver bus) $227_T$, $227_R$.

The T-BUS $227_T$ is an internal bus capable of permitting bi-directional data transfer, and the R-BUS $227_R$ is an internal bus capable of permitting only uni-directional data transfer. Both the buses have a 16-bit width and mainly serve for data transfer between registers inside the one-chip CPU 101.

The one-chip CPU 101 further includes a NOR gate 308 which constitutes part of the subject matter of the invention, a set/reset flip-flop (hereinafter referred to as FF) 309 and a prefetch control mechanism (not shown). The NOR gate 308 receives the output (16 bits) of the ALU 220 and a check timing signal CHCK (active "0"), and its output is coupled to a set terminal S of the FF 309. The FF 309 is set in response to the output signal of logic "1" from the NOR gate 308 and produces an instruction buffer empty signal IBE. The instruction buffer empty signal IBE is coupled to an instruction prefetch control mechanism, whereby successive user instructions are buffered from main memory (MM) to the $IB_{0-3}$ 203. When the instruction fetch cycle is completed, the FF 309 is reset. It is also reset when the $IB_{0-3}$ 203 becomes empty as a result of execution of a microinstruction having a parameter for ending instruction decoding and when the $IB_{0-3}$ 203 becomes empty as a result of execution of a microinstruction specifying the $IB_{0-3}$ 203 as a source register. It is set as a result of execution of a microinstruction specifying the LOC register 208 as a destination register, which may occur when the user executes a branch instruction or upon receipt of an interrupt.

External input and output signals appearing at terminals (connection pins) of the one-chip CPU 101 exclusive of those through the C-BUS 103 and ROM address line RAL (12 bits) are as follows.

(1) ROE (ROM output enable)

A signal for enabling a microinstruction to be read out from the C-ROM 102 onto the C-BUS 103. It is also used to control the gate which separates the inner and outer portions of the C-BUS 103 and as a timing signal for enabling the external signal group (TEST 0 or TEST 1) onto the C-BUS 103.

(2) PSEL (processor select).

A signal indicating that the one-chip CPU is occupying the memory bus.

(3) MA (memory address)

A signal indicating that the signal on the C-BUS 103 is an address in main memory. In response to this signal the memory address can be latched in the latch circuit A-LATCH 107.

(4) SYCNT (system control)

A timing signal for latching (or releasing) a control signal input to the external addressable latch circuit $104_1$.

(5) IOCNT (I/O control)

A timing signal for latching (or releasing) a control signal input to the external addressable latch circuit $104_2$.

(6) CNTD (control data)

A signal for controlling the setting and resetting of the addressable latch circuits $104_1$ and $104_2$. When SYCNT or IOCNT is pulsed, the CNTD signal is read into one of the 8 flip-flops of latch circuit $104_1$ or $104_2$, respectively.

(7) $SEL_{0, 1, 2}$ (select).

A 3-bit select signal for selecting which of the 8 flip-flops in the addressable latch circuit $104_1$ or $104_2$ will receive the CNTD signal.

(8) SYN (synchronous)

A response signal from I/O (input/output) unit. From this signal the presence of a counterpart unit (I/O) can be confirmed.

(9) REQ (request)

A signal produced when a memory cycle is requested by the direct memory access unit (for example I/O input connected to I/O bus).

(10) EN (enable)

An enable signal which is returned to the direct memory access unit when a request signal REQ is received therefrom.

(11) BBSY (bus busy)

This signal is one of the memory control signals and is used as a start/end signal for a main memory access.

(12) MEAN (memory access end)

A signal produced when the use of memory bus MDL in a main memory access is completed.

(13) ERR (error)

An error signal which is coupled on a time division basis upon generation of PE (party error), PRTE (protect error), PBE (conversion table non-definition error), etc.

(14) SCLR (system clear)

An initialization signal for initializing predetermined internal registers.

(15) STB (strobe)

A main strobe signal which controls the generation of the memory control system signal.

(16) EBCLK (basic clock)

A basic clock supplied by the clock generator 106. On the basis of this clock EBCLK, an internal clock signal is produced in the DECODE & CONT 223.

(17) VDD, GND

Working DC voltages supplied from an external power supply (VDD= +5 V, GND=0 V)

Now, part of the construction outside the one-chip CPU 101 will be described. Of the addressable latch circuits $104_1$ and $104_2$ provided outside the one-chip CPU 101, the circuit $104_1$ produces 8 different external control signals (EXA) for console system according to the aforementioned signals (CNTD, SYCNT and $SEL_{0-2}$. The circuit $104_2$ produces 8 different external control signals EXB for I/O system according to the signals CNTD, IOCONT and $SEL_{0-2}$. Of these external control signals (EXA and EXB), all but the one-bit TEST signal are irrelevant to the invention, and their description is omitted. The TEST signal produced from the addressable latch circuit $104_1$ specifies either TEST 0 or TEST 1, and is coupled together with a microinstruction (20 bits) produced from the C-ROM 102 through the C-BUS 103 to the one-chip CPU 101. When the TEST signal is at logic level "1", TEST 1 is selected, and when it is at logic level "0", TEST 0 is selected. More particularly, when the TEST signal is "1", an inverter $INV_1$ which inverts the ROE signal, the active level of which is "0", produces a "1" output. Thus, a "1" signal is coupled through an AND gate $A_1$ to open the gate $G_3$, whereby the TEST 1 external signal group (12 bits) is coupled, together with a microinstruction (20 bits) read out from the C-ROM 102, through the C-BUS 103 to the one-chip CPU 101. When the TEST signal is at logic level "0", an output signal "1" of an inverter $INV_2$ (which inverts this signal) and the aforementioned output signal "1" of the inverter $INV_1$ are coupled to an AND gate $A_2$, which thus produces an "1" output signal to open the gate $G_2$, whereby the TEST 0 external signal group (12 bits) is similarly coupled through the C-BUS 103 to the one-chip CPU 101. The TEST signal is at logic level "0" during system initialization and at logic level "1" during ordinary microprogram control. Thus, during initialization the TEST 0 external signal group is coupled to the one-chip CPU 101 in a microinstruction read cycle, while the remainder of the time the TEST 1 external control signal is coupled to the one-chip CPU 101 in a microinstruction read cycle.

The TEST 0 external signal group coupled to the one-chip CPU 101 is stored in the MODE register 225, while the TEST 1 external signal group is stored in the XSGN register 224. The aforementioned AM signal produced from the AM-LOG 300 is contained in the TEST 1 external signal group stored in the XSGN register 224. Also, the PBE signal is contained in the TEST 1 external signal group stored in the XSGN register 224. This PBE signal is output from the conversion table $105_T$ of the address conversion unit 105 whenever main memory is accessed. It is a one-bit signal indicating whether the segment (or page) in the conversion table $105_T$ specified by the logical memory address is undefined. The PBE signal becomes logic level "1" when the specified address is undefined and logic level "0" when it is defined.

While the PBE signal is coupled together with the other TEST 1 external signals through the C-BUS 103 to the one-chip CPU 101 and stored in the XSGN register 224 in a predetermined bit position thereof in a user instruction read cycle, it is not stored there simultaneously with the other TEST 1 signals. More particularly, it is temporarily stored in the $PBE_{0-3}$ 203y which is provided to correspond to the $IB_{0-3}$ 203. The PBE signal is read into the XSGN 224 only when the corresponding user instruction from the $IB_{0-3}$ is read into the IR 202.

Designated at 107 is an address latch circuit (A-LATCH) having a 24-bit contruction for latching therein 16-bit logical address data from the MAR register 206 and 8-bit segment data from the SGA register $207_1$ (or SGB register $207_2$). Data from the A-LATCH 107 is coupled to the one-chip CPU 101 through the C-BUS 103, according to the MA signal.

Designated at 108 is a data selector which determines which of two devices is to access main memory by consulting the conversion table $105_T$. When the one-chip CPU 101 accesses main memory (when PSEL signal is at logic level "1"), the selector selects the address information obtained from the address latch circuit 107. When the direct memory access unit accesses main memory (when the PSEL signal is at logical level "0"), the selector selects the address information sent from the direct memory access unit.

Designated at 109 is a memory control signal latch circuit (hereinafter referred to as MCS-LATCH circuit) for latching 8 bits of memory control system data transferred from the MER register 226 inside the one-chip CPU 101 in response to the MA signal produced by the one-chip CPU 101. The contents of the MER register 226 are output together with the contents (total 24 bits) of the MAR register 206 and SGA register $207_1$ (or SGB register $207_2$).

Designated at 110 is a protection table (PT) constituting a memory protection mechanism. Designated at $G_8$ is a gate for permitting the memory protection data to be written into or read from the protection table 110 through the C-BUS 103. Designated at 111 is a parity circuit for producing a parity bit with respect to the memory date and effecting a parity check.

Designated at 301 to 305 are component parts of the AM-LOG 300. More particularly, designated at 301 is a switch (A-SW) for setting the stop address, provided on an operation panel, for instance. Designated at 302 is a latch circuit (SA-LATCH) for latching therein a memory address (logical address) transferred thereto on every main memory access. Designated at 303 is a comparator, which compares the two addresses and produces an AM signal which is at the logic "1" level when and only when the compared addresses coincide. Designated at 304 and 305 are gates for changing the bit width of the addresses to be compared in the comparator 303 depending on whether main memory is being read from or written into. While data is handled inside the one-chip CPU 101 with 16 bit data paths, and is written into memory 16 bits (2 bytes) at a time, data is read from main memory 32 bits (4 bytes) at a time. (16 bits are referred to herein as a half word, and 32 bits are referred to herein as a full word). On the comparator 303 it is impossible to determine which half-word of the data read out from the main memory is the half actually requested by the one-chip CPU 101, and therefore the comparator 303 makes comparisons assuming that the requested half word is in fact the matching half-word. More particularly, when writing data into main memory the comparitor considers only the high order 15 bits of the addresses, ignorning the low order bit. When reading data, the comparator considers only the high order 14 bits, ignoring the low order 2 bits. The aforementioned gates 304 and 305 serve to control the switching of the bit width of the addresses to be compared. When the comparison is to be made, a WRT signal produced from a memory control signal stored in the MSC-LATCH circuit 109, is coupled to the gates 304 and 305. The WRT signal is at a logic level "1" when data is being written into main memory, and at a logic level "0" when data is being read.

Figure 4:
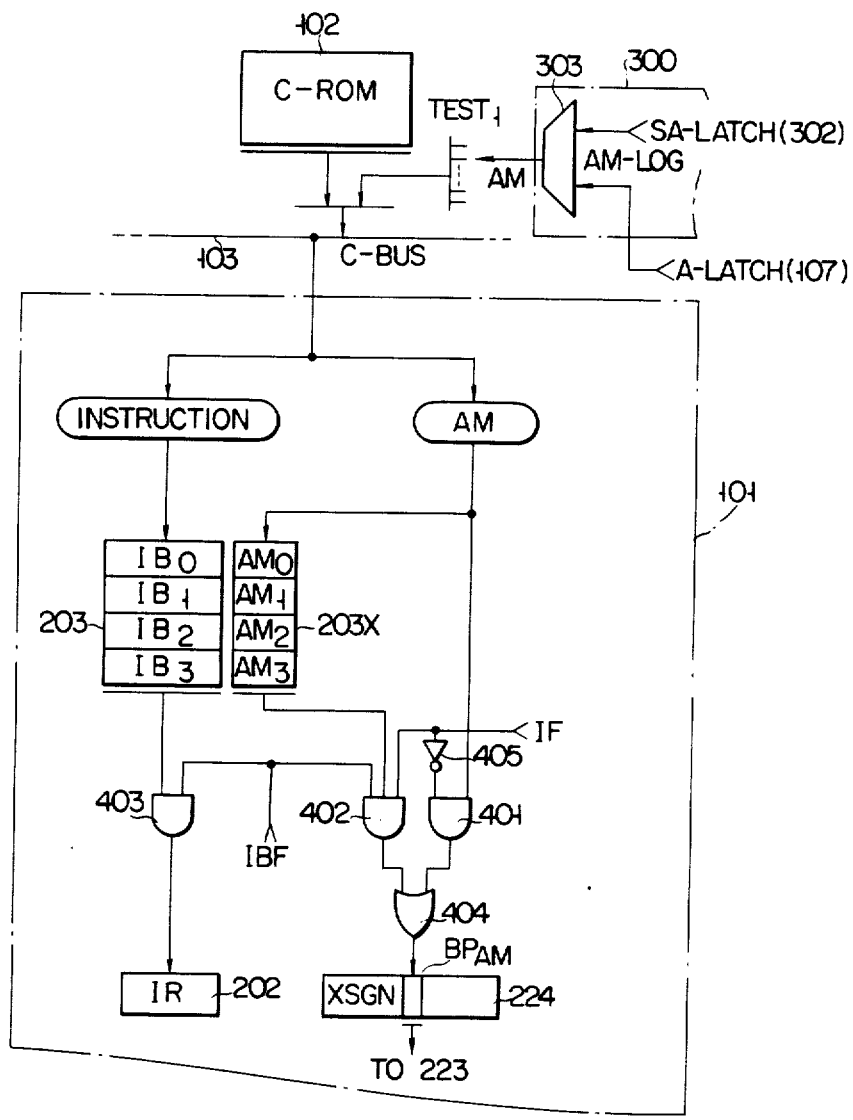
FIG. 4 is a detailed block diagram showing the Address Match (AM) signal transfer path inside the one-chip CPU shown in FIG. 3.

FIG. 4 is block diagram of the AM signal transfer path inside the one-chip CPU 101. In the Figure, designated at 401, 402 and 403 are AND gates, at 404 an OR gate, and at 405 inverter. IF and IFB are both control signals. The IF (instruction fetch) signal is at logic level "1" when the CPU 101 is fetching an instruction from main memory and is otherwise at logic level "0". The IBF (instruction buffer fetch) signal is at logic level "1" when a prefetched instruction stored in the $IB_{0-3}$ 203 is being transferred to the IR 202 and is otherwise at logic level "0".

As mentioned earlier, the AM signal which is contained in the TEST 1 external signal group, coupled (together with a microinstruction) through the C-BUS 103 to the one-chip CPU 101, is written into the XSGN register 224 differently, depending on whether the memory access was an operand fetch or an instruction fetch. During an operand fetch, the AM signal is directly coupled (together with the other TEST 1 signals) through the C-BUS 103 to the XSGN register 224. During an instruction fetch, it is temporarily stored in the $AM_{0-3}$ 203x; it is coupled to the XSGN register 224 from the $AM_{0-3}$ 203x only when the corresponding user instruction is read out from the $IB_{0-3}$ 203 to the IR 202. During an operand fetch, the IF signal is at a logic level "0". The AND gate 401 is therefore open to the AM signal since the output of the inverter 405 is at a logic level "1". The AM singal coupled to the one-chip CPU 101 is therefore immediately coupled through the AND gate 401 and OR gate 404 to the XSGN register 224 at the predefined bit position $BP_{AM}$ thereof. On the other hand, during an instruction fetch, the IF signal is at a logic level "1". The AND gate 401 is closed, and the AM signal coupled to the one-chip CPU 101 is temporarily stored in a bit position ($AM_i$) of the $AM_{0-3}$ 203x corresponding to a buffer ($IB_i$) of the $IB_{0-3}$ 203 where the fetched user instruction is stored. The AM signal thus stored in the bit position ($AM_i$) is coupled through the AND gate 402 and OR gate 404 to the predetermined bit position $BP_{AM}$ of the XSGN register 224 at the same time that the user instruction stored in the corresponding buffer ($IB_i$) of the $IB_{0-3}$ 203 is fetched therefrom and coupled through the AND gate 403 to the IR 202 in response to the IBF signal (logic level "1").

Now, the operation of the construction of FIG. 3 will be described with reference to a state diagram of FIG. 5. FIG. 5 shows an example of various parts of the circuit of FIG. 3 having direct bearing upon the invention in a situation when a write instruction to the main memory MM is encountered. It is assumed that the contents in the addresses (alpha+8), (alpha+6), (alpha+4) and (alpha+2) of the main memory MM, having been prefetched, are stored as 16 bits (2 bytes) each in the $IB_{0-3}$ 203. At this time, the FF 309 is thus in the reset state. Also, the user instruction being executed, i.e., the contents of address alpha of main memory MM, is held in the IR register 202. It is assumed that the contents of the address alpha mentioned above is a write instruction (i.e., store instruction) with respect to the main memory MM. Further, in the LOC counter 208 the location of the user instruction to be executed next, i.e., the address (alpha+2) of the main memory MM, is held, and in the ALOC counter 209 the location of the next user instruction to be prefetched, i.e., the address (alpha+A) of the main memory MM, is held. Further, the MAR register 206 holds the main memory destination address, for instance address (alpha+4), according to the user instruction in IR 202.

Figure 1:
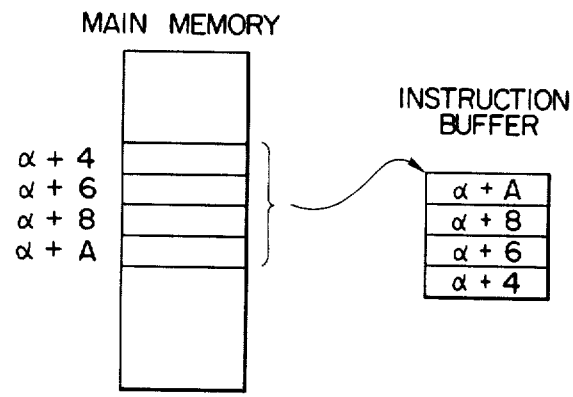
FIG. 1 is a schematic view illustrating the concept of the general instruction prefetch.
Figure 6:
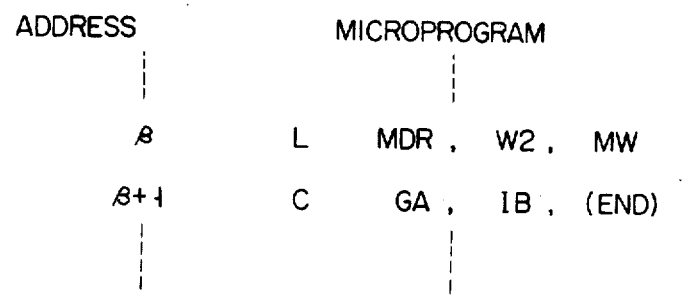
FIG. 6 is a view illustrating a microprogram for executing a write instruction used with an emodiment of the invention.

In the mean time, a microprogram for executing a user write instruction, used in the instant embodiment, will be described with reference to FIG. 6. FIG. 6 shows an example of the microprogram. A microinstruction stored in the address beta of the C-ROM 102 loads the contents of the $WR_2$ register of the $WR_{0-7}$ 211 into the MDR register (which is not actually present but is substituted for by the MDRH register 204 and MDRL register 205). The same microinstruction then writes the data into a predetermined address of the main memory MM (in the instant embodiment the address (alpha+4)), held in the MAR register 206, through the C-BUS 103. Usually, a major proportion of the microinstructions that follow this write instruction are non-operational instructions. For this reason, microinstructions for comparison only with the ALU 220 to be described later are prepared as microinstructions following the aforementioned write instruction.

A microinstruction stored in the address (beta+1) of the C-ROM 102 has a construction for the following execution. During the execution of this microinstruction, which is still part of the user's write instruction, the contents of the MAR register 206 are output to the T-BUS $227_T$, and the contents of the LOC counter 208 are output to the R-BUS $227_R$. The ALU 220 executes the subtraction [(MAR)−(LOC)], and outputs the result to the TBUS $227_T$. The signal on the upper 13 bits on T-BUS $227_T$ are then coupled to the NOR gate 308. Meanwhile, the check timing signal CHCK is brought to its active ("0") state at a predetermined time and also coupled to the NOR gate 308. Thus, whether the signal of the upper 13 bits of the value [(MAR)−(LOC)] are all at logical level "0" is checked through the execution of the aforementioned microinstruction. If all the bits are at logic level "0", the NOR gate 308 produces an output signal of logic level "1".

It will be obvious that the NOR gate 308 produces the logic level "1" output signal when and only when the result of the subtraction, i.e., the value of [(MAR)−(LOC)] is $0000000000000XXX_2$ (X being either "0" or "1"). The lower 2 bits ("$XXX_2$") here can take any value between the minimum value "$000_2$" (which is decimal 0) and the maximum value "$111_2$" (which is decimal 7), and the NOR gate 308 will still output a "1". Thus, it will be seen that the NOR gate 301 produces the logic "1" output signal when and only when $0 \leq (MAR) - (LOC) < 8$.

The output (active "1") of the NOR gate 308 is coupled to the set terminal S of the FF 302, which thus produces an active instruction buffer empty signal IBE. In response thereto, the contents of the $IB_{0-3}$ buffer 203 are replaced through the operation of a buffer empty control mechanism (not shown).

As is shown, in the instant embodiment if the condition $0 \leq (MAR) - (LOC) < 8$ is satisfied when a write instruction is executed with respect to the main memory MM, the contents of the $IB_{0-3}$ 203 are made ineffective by determining that the destination address is one of those which have been buffered in the $IB_{0-3}$ 203. Thus, when the address (alpha+4) is specified by the MAR register 206 as shown in FIG. 5, (MAR)−(LOC)=6, and the contents of the $IB_{0-3}$ buffer 203 are made ineffective and are replaced.

Now, the basis on which the contents of the $IB_{0-3}$ buffer 203 are made ineffective when $0 \leq (MAR) - (LOC) < 8$ will be discussed in detail with reference to FIG. 5. It will be seen from the Figure that the contents of the $IB_{0-3}$ buffer 203 must be made ineffective when the address specified by the MAR register 206 coincides with one of the addresses (alpha+2) through (alpha+8) of the main memory MM. In the LOC counter 208, the location (address (alpha+2)) of the next user instruction to be executed is held. Thus, the contents of the $IB_{0-3}$ buffer 203 are made ineffective when the value [(MAR)−(LOC)] is [(alpha+2)−(alpha+2)]≦[(MAR)−(LOC)]<[(alpha+A)−(alpha+2)]; that is, $$0 \leq (MAR) - (LOC) < 8 \qquad (1)$$

Rewriting the formula (1) we obtain $$0 \leq (MAR) - (LOC) < 2^3 \qquad (2)$$

as mentioned above. Thus, with the instant embodiment the subtraction [(MAR)−(LOC)] can be executed with the ALU 220 as discussed in detail before, and the decision as to formula (2), i.e., decision as to whether the contents of the $IB_{0-3}$ buffer 203 are to be made ineffective, can be obtained without provision of any discriminating means (either hardware or software) regarding the result of subtraction, but can be obtained with the NOR gate 308 alone. This means that with the instant embodiment a high performance unit can be made in a one-chip CPU without need to increase hardware, i.e., without increasing the chip area.

Now, the case when the contents of the $IB_{0\text{-}3}$ buffer 203 is made ineffective upon encountering a branch instruction will be discussed. When a user branch instruction is executed, the flow of the program is changed, and thus the instructions prebuffered (i.e., contents of the $IB_{0\text{-}3}$ buffer 203) must be made ineffective. They must also be made ineffective when the flow is changed by an interrupt. In the microprogram for executing such instructions, a microinstruction which specifies the LOC counter 208 as a destination register is used. In this embodiment, such a microinstruction is related to the DECODE & CONT 223 such that when the microinstruction is executed, a new predetermined value is set in the ALOC counter 209 to set the FF 309. When the FF 309 is set, the prefetch control mechanism automatically operates to replace the contents of the $IB_{0\text{-}3}$ 203 from the value specified by the ALOC counter 209. As a result, the replacement of the contents of the $IB_{0\text{-}3}$ buffer 203 is effected like the case discussed above.

While in the above embodiment, the decision as to formula (2) for zero check has been done by ignoring the lower 3 bits in the result of the substraction in the ALU 220 and coupling the remaining (upper 13) bits into the NOR gate 308, it is also possible to permit the decision with respect to formula (1) to be carried out by providing a discriminating means. This is obviously advantageous compared to a means using a comparator although there is a disadvantage that hardware must be made somewhat more extensive compared to the embodiment using formula (2). Besides, since a stricter decision can be expected compared to the above embodiment as will be discussed later, there is no probability of excessive replacement of the contents of $IB_{0\text{-}3}$ buffer 203.

Further, while in the above embodiment four buffer stages each having a capacity of 2 bytes have been provided as the $IB_{0\text{-}3}$ buffer 203, this is by no means limiting. In general, where there are M buffer stages each having a capacity of N bytes, a decision as to $$0 \leq (MAR) - (LOC) < M \times N \qquad (3)$$

may be done. Also, where the discriminating means in the above embodiment (i.e., the NOR gate 308) is used, the instruction buffer contents may be made ineffective when there holds a condition $$0 \leq (MAR) - (LOC) < L = 2^m \text{ (m being an integer)} \qquad (4)$$

where L is a certain value satisfying $M \times N \leq L = 2^m$. In this case, only the upper bits of the subtraction result, exclusive of the lower m bits, should be coupled to the NOR gate 308 for the decision. With this means, although any discriminating means is needed, it is likely that the replacement of the instruction buffer contents is done more than necessary when $M \times N$ is such that L must be strictly greater than $M \times N$ (i.e. because L must be a power of 2). The decision content is liable to be less strict. However, even if replacement of the instruction buffer contents is done more than necessary, it would not result in any malfunction at all and need not cause concern.

Further, while in the above embodiment the subtraction [(MAR)−(LOC)] has been executed with the ALU 220, it is also possible to provide a subtractor for this subtraction. In this case, it is possible to obtain a great advantage that VLSI can be realized over the means using two comparators, although some increase of hardware is necessary. Although a subtractor is practically the same as two comparators in the number of circuits that are involved, in the latter case the realization in VLSI encounters wiring difficulties.

Now, the operation of address detection and address stopping by address matching will be described. When an execution stop address (logical address) is set by the address setting switch 301 of the AM-LOG 300, it is latched in the SA-LATCH 302. When the address data transferred from the one-chip CPU 101 through the C-BUS 103 is stored in the A-LATCH 107 when the CPU accesses main memory, the address stored in SA-LATCH 302 and the logical address stored in A-LATCH 107 are compared in the comparator 303 of the AM-LOG 300. If the memory access is for the purpose of reading data therefrom the WRT signal is at a logic level "0" so that the gates 304 and 305 are closed. In this situation only the high order 14 bits, exclusive of the low order two bits, are compared. If the memory access is for the purpose of writing data into main memory, the WRT signal is at a logic level "1" so that the gates 304 and 305 are open. In this situtation only the high order 15 bits, exclusive of the low order one bit, are compared. If the compared addresses in the comparator 303 coincide, an AM signal of logic level "1" is produced. If they do not coincide a signal of logic level "0" is produced. This AM signal is coupled to the TEST 1 external signal input terminal and is coupled, together with the microinstruction read out from the C-ROM 102 and other signals in the TEST 1 external signal group, through the C-BUS 103 to the one-chip CPU 101 in the aforementioned microinstruction read cycle after the transfer of memory address data from the one-chip CPU 101. The microinstruction coupled to the one-chip CPU 101 is stored in the MIR register 201. While the TEST 1 external signal group is stored in the XSGN register 224, the AM signal is stored either in the XSGN register 224 (together with the other TEST 1 external signals) or in the $AM_{0\text{-}3}$ 203x. More particularly, when the one-chip CPU accesses main memory to fetch an operand, at which time the IF signal shown in FIG. 4 is "0", the AM signal on the C-BUS 103 is coupled through the AND gate 401 and OR gate 404 to the XSGN register 224 and stored therein together with the other TEST 1 external signals. When the one-chip CPU 101 accesses main memory to fetch an instruction (i.e., for instruction prebuffering), at which time the IF signal is at logic level "1", the AND gate 401 is closed, the AM signal on the C-BUS 103 is not immediately coupled to the XSGN register 224 but instead is stored in the $AM_{0\text{-}3}$ 203x. In such a situation, the AM signal is stored in the $AM_{0\text{-}3}$ 203x at a bit position ($AM_i$) thereof corresponding to the buffer position ($IB_i$) of the $IB_{0\text{-}3}$ where a corresponding user instruction is stored. Also, in this situation the user instruction read out from the main memory in the memory data transfer cycle (i.e., the prefetched instruction) is coupled through the C-BUS 103 to the one-chip CPU 101 and stored in the aforementioned buffer position ($IB_i$) of the $IB_{0\text{-}3}$ 203. It is to be noted that at the time of prefetching an instruction, the instruction word prefetched and the corresponding AM signal are always stored in the $IB_{0-3}$ 203 and $AM_{0-3}$ 203x respectively in a fixed correspondence relation to each other. The AM signal stored in the $AM_{0-3}$ 203x is read out at the same time as the corresponding instruction word is fetched from the $IB_{0-3}$ 203 (i.e., IBF timing). The instruction word fetched from the $IB_{0-3}$ 203 is stored in the IR 202, and the AM signal fetched from the $AM_{0-3}$ 203x is stored in the XSGN register 224 at a predetermined bit position ($BP_{AM}$) thereof. As has been shown, at the time of making access to the main memory of the one-chip CPU 101 the AM signal output from the AM-LOG 300 is immediately coupled to the XSGN register 224 in the one-chip CPU 101 when an operand is fetched, while when an instruction is fetched, in addition to prefetching and storing the corresponding instruction word, the AM signal is temporarily stored in the $AM_{0-3}$ 203x and coupled to the XSGN register 224 at the timing at which the corresponding instruction word is transferred to the IR 202. If the AM signal given to the XSGN register 224 is at logic level "1", an interrupt is immediately produced for address stop, whereby the execution of the instruction having been in force is stopped. In the above way, upon detection of the coincidence of addresses (i.e., AM="1") when fetching an operand in the instruction under execution the address stop is immediately brought about (for the operand is not buffered), while upon detection of the address coincidence when fetching an instruction, the address stop is brought about at the timing at which the prefetched instruction is transferred to the IR 202 for execution.

Now it will be described how to interrupt data access between the main memory and the one-chip CPU 101 when the one-chip CPU 101 designates an illegal address.

To give the one-chip CPU 101 access to main memory to prefetch an instruction, 8-bits of memory control data are supplied through the C-BUS 103 from the MER 226 together with 24-bits of memory address data. The 24-bits of memory address data consist of a 16-bit main memory logical address which is stored in the MAR 206 in the one-chip CPU 101, and an 8-bit segment address which is stored in the SGA 207$_1$ or SGB 207$_2$. When the 8-bits of memory control data and the 24-bits of memory address data are supplied via the C-BUS 103, no ROE signal is produced and an MA signal of "0" is produced. Thus, the 24-bit memory address data is transmitted through the gate circuit G$_4$ and latched by the address latch circuit 107, and the 8-bits of memory control data are latched by the memory control signal latch circuit 109. A part of the logical address data stored in the latch circuit 107 is transmitted to the address conversion table 105$_T$ through the selector 108. Table indexing is then carried out, thus effecting logical-to-physical address conversion. More specifically, the address data from the selector 108 designates a segment, and the contents of the table corresponding to the segment thus designated are delivered from the table 105$_T$. The output data of the table 105$_T$ is combined with the logical address data stored in the latch circuit 107, thus providing a physical address which designates the address where there will be found the instruction which is designated by the one-chip CPU 101 and which is to be prefetched. The physical address data is supplied to the main memory via the memory address line MAL.

At the time of the consultation with the conversion table 105$_T$, the one-bit PBE signal showing whether the specified segment is defined is also generated by the conversion table 105$_T$. This PBE signal is coupled, together with the microinstruction read out from the C-ROM 102 and other TEST 1 external signals, through the C-BUS 103 to the one-chip CPU 101 in the aforementioned microinstruction read cycle after the memory address transfer. The microinstruction coupled to the one-chip CPU 101 is stored in the MIR register 201, while the TEST 1 external signal group except for the PBE signal is stored in the XSGN register 224. The PBE signal is instead stored in the $PBE_{0-3}$ 203y at a bit position ($PBE_i$) thereof corresponding to the buffer position ($IB_i$) where the corresponding instruction word is stored. Meanwhile, in the main memory, physical address data having been transmitted thereto through the memory address line MAL, an instruction word is read out under the control of a control signal from the one-chip CPU 101 or the like. The instruction word is output through the memory data line MDL and gates G$_5$ and G$_6$ to the C-BUS 103 and thence coupled to the one-chip CPU 101 and stored in a buffering ($IB_i$) of the $IB_{0-3}$ 203 in the memory data transfer cycle following the microinstruction read cycle. In the above way, the prefetching of an instruction and accompanying buffering of the PBE signal are effected, and the PBE signal corresponding to the prefetched instruction word is always held in a fixed correspondence relation thereto. When the next instruction word is fetched from the $IB_{0-3}$ 203 and put in the IR 202 after the end of the execution of the previous instruction in the IR register 202, the corresponding bit (PBE signal) in the $PBE_{0-3}$ 203y is simultaneously read out and stored in the XSGN register 224 at a predetermined bit position thereof. If the PBE signal coupled to the XSGN register 224 at this time is at a logic level "1", the interrupt generation mechanism is actuated to bring about an interrupt. In this way, an illegal address interrupt can be produced at the timing at which the prefetched instruction is actually moved into the IR 202.

While in the above embodiment the PBE signal output from the address conversion table 105$_T$ is coupled through the TEST 1 external signal terminal to the C-BUS 103 and thence, together with the microinstruction, to the one-chip CPU 101, it is also possible to permit the PBE signal to be written in together with such external signals as PE and PRTE through the ERR terminal on a time division basis. Even in this case, the PBE signal can be coupled to the one-chip CPU 101 without the need to assign any dedicated external connection pin for coupling the PBE signal.

What we claim is:

1. In an information-processing system, an arithmetic control unit formed on one chip comprising:
a flip-flop for indicating that user instructions are to be prefetched from an external main memory;
means for prefetching a plurality of user instructions from the main memory while the flip-flop is not set;
a plurality of instruction buffers for storing the user instructions prefetched from the main memory, each of said buffers having M stages each having a memory capacity of N bytes;
a location counter for storing data representing the location of a user instruction to be executed next;
a memory address register for storing data designating an address of the main memory to be accessed;

subtracting means for subtracting the contents of the location counter from the contents of the memory address register;

means for setting the flip-flop when branching is established while the user instructions are being executed or when the result of the subtraction carried out by the subtracting means is equal to or greater than 0 and smaller than M×N and means for causing the user instruction-prefetching means to replace the contents of the instruction buffers while the flip-flop is set.

2. An information-processing system according to claim 1, wherein said subtracting means comprises an arithmetic-logic unit disposed in said one chip arithmetic control unit.

3. An information-processing system according to claim 2, further comprising means disposed in said one chip arithmetic control unit for setting the flip-flop when all but the m least significant bits of the output of said arithmetic-logic unit are logical "0"'s, where m is an integer and $M \times N \leq 2^m$.

4. An information-processing system according to claim 3, wherein said means for setting the flip-flop comprises a logic gate circuit.

* * * * *

UNITED STATES PATENT AND TRADEMARK OFFICE
CERTIFICATE OF CORRECTION

PATENT NO. : 4,616,331
DATED : October 7, 1986
INVENTOR(S) : T. Kinoshita, et al It is certified that error appears in the above-identified patent and that said Letters Patent is hereby corrected as shown below:

On the title page Insert

--(73) Assignee: Tokyo Shibaura Denki Kabushiki Kaisha, Kawasaki-Shi, Japan --.
Title page, add name of law firm,
-- Kenyon & Kenyon --.

Signed and Sealed this

Twenty-fourth Day of November, 1987

*Attest:*

*Attesting Officer*

DONALD J. QUIGG

*Commissioner of Patents and Trademarks*